Figure 2:
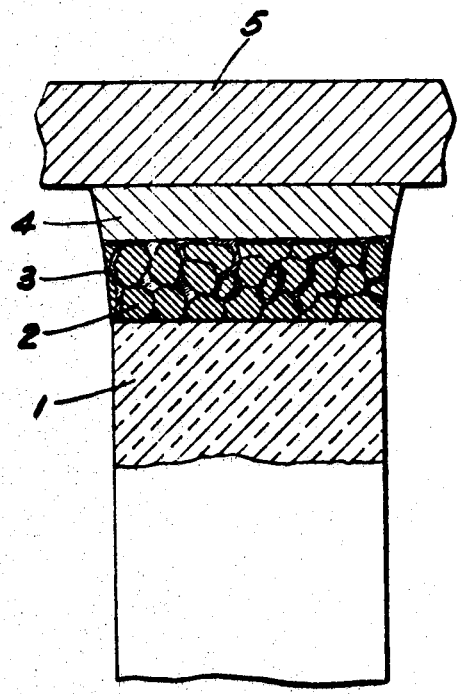

June 4, 1968  A. MILCH ET AL  3,386,159

METHOD OF FORMING A REFRACTORY METAL-TO-CERAMIC SEAL

Original Filed May 4, 1964

INVENTORS
ALFRED MILCH
JOSEPH J. LALAK
RICHARD H. AHLERT

BY
AGENT 3,386,159
METHOD OF FORMING A REFRACTORY
METAL-TO-CERAMIC SEAL
Alfred Milch, Teaneck, N.J., and Joseph J. Lalak, Briarcliff Manor, and Richard H. Ahlert, Spring Valley, N.Y., assignors to North American Philips Company, Inc., New York, N.Y., a corporation of Delaware
Original application May 4, 1964, Ser. No. 364,739, now Patent No. 3,340,025, dated Sept. 5, 1967. Divided and this application Jan. 24, 1967, Ser. No. 632,843
14 Claims. (Cl. 29—473.1)

This application is a division of Ser. No. 364,739 which was filed May 4, 1964, and granted Patent No. 3,340,025 on Sept. 5, 1967.

Our invention relates to refractory ceramic-to-metal seals, and to a method of sealing a metal body to a ceramic body.

A principal object of our invention is to provide a refractory metal-to-ceramic seal which is mechanically strong and can withstand high temperatures with repeated cycling from ambient to such high temperatures.

A further object of our invention is to provide a hermetic refractory ceramic-to-metal seal and method of making the same.

A still further object of our invention is to provide a metal-to-ceramic seal which is hermetic and resistant to attack by alkali-metal vapors, particularly cesium vapor.

Another object of our invention is to provide strong hermetic refractory ceramic-to-metal bonds that can withstand higher use temperatures than known ceramic-to-metal bonds.

These and further objects of our invention will appear as the specification progresses.

In accordance with the invention, we have found that refractory ceramics such as aluminas, including synthetic sapphire, magnesia, spinels and the like can be bonded to metals by first forming on the ceramic body a tightly-adherent spongy layer of molybdenum, or tungsten, or a combination thereof to form a strong mechanical bond with the ceramic. This sponge is then treated with a special refractory metal wetting agent so as to render the interior and exterior surfaces of the spongy layer wettable by a subsequent brazing metal. We have found that rhenium, or binary alloys consisting of molybdenum and ruthenium or molybdenum and rhodium are suitable wetting agents and are crucial to the formation of refractory hermetic seals according to the invention. The ceramic body which is covered by the spongy layer and wetting agent can then be brazed to a refractory metal by conventional brazing methods to produce a refractory hermetic seal.

As refractory metals for sealing to the ceramic according to the practice of the invention, we prefer metals which will not react with hydrogen to form hydrides and which will not react with alkali-metal vapors such as cesium. Thus, we have found that the metals which are best suited to our invention are molybdenum, rhenium, and tungsten. However, tantalum, niobium, and other reactive refractory metals are also suitable provided they are kept from exposure to hydrogen at elevated temperatures.

In a preferred embodiment of our invention, a spongy layer of molybdenum or tungsten or combinations thereof is formed on the surface of the ceramic body by first depositing on the surface of the ceramic a layer of powdered molybdenum oxide or tungsten oxide or a mixture thereof which is reduced to metal and fired to form a tightly-coherent mass by heating in a reducing atmosphere, preferably hydrogen. The composition of this reducing atmosphere and the firing conditions are of some importance. In general, high humidity, high firing temperatures, and long firing times produce the best results. On the other hand, inert diluents such as nitrogen may be tolerated under certain circumstances. In any event, a properly sintered layer is spongy and porous, but very coherent and strongly bonded to the underlying ceramic.

In order to braze a metal to the spongy layer, it is necessary to treat said spongy layer with a special wetting agent which can render its interior and exterior surfaces wettable by the brazing metal. In one embodiment of our invention, we employ rhenium as a wetting agent. Preferably, a few drops of a concentrated water solution of rhenium heptoxide ($Re_2O_7$) is placed over the spongy refractory metal layer and fired in a reducing atmosphere to a temperature well above that at which the rhenium oxide is reduced to rhenium. The rhenium forms a thin layer covering the interior and exterior surfaces of the spongy metal layer without filling the pores of that layer. Conventional brazing metal subsequently fills the pores of the metal spongy layer and adheres to the rhenium coated surfaces thereof.

In another embodiment of our invention, we employ as a wetting agent an alloy of molybdenum and ruthenium, or an alloy of molybdenum and rhodium. In this case, we apply over the spongy metal surface a powdered mixture of molybdenum oxide and ruthenium oxide, or a mixture of molybdenum oxide and rhodium oxide, which is heated in a reducing atmosphere to reduce the oxides to metal and to form alloys which not only wet the surfaces of the spongy metal layer, but also penetrate and fill the pores thereof as well. The resulting body then has a surface of an alloy of these metals to which a brazing metal can adhere.

The so-treated ceramic body can now be brazed to a metal body. For seals which must withstand very high temperature, we prefer to braze the so-coated ceramic body to a metal such as molybdenum, rhenium, or tungsten, and we may employ as brazing metals those which have a melting point lower than that of the ceramic or metal body and high enough to withstand the environment temperature to which the ceramic-to-metal seal will be exposed. Thus, binary alloys of ruthenium and molybdenum, or of molybdenum and rhodium are preferred. Other conventional brazing alloys, such as those of copper, nickel, cobalt and palladium, may also be employed provided that the final use temperature is lower than the melting point of the braze material.

Figure 1:
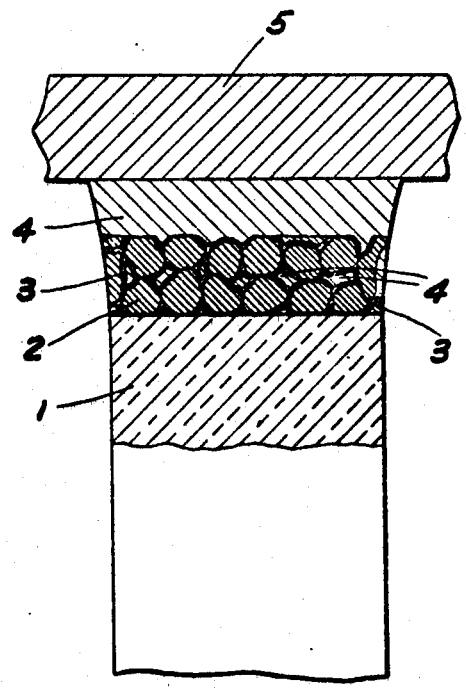

The invention will be described with reference to the accompanying drawing in which:

FIG. 1 is a cross-sectional view of a metal body bonded to a ceramic body employing rhenium as a wetting agent; and FIG. 2 is a cross-sectional view of a metal body bonded to a ceramic body employing an alloy of molybdenum and ruthenium as a wetting agent.

Referring to FIG. 1 of the drawing, a ceramic body 1 consisting of alumina ($Al_2O_3$) is covered with a spongy, porous layer 2 of molybdenum or tungsten or combinations thereof (shown greatly exaggerated in the drawing) which tightly adheres to the surface. This spongy layer was formed by first applying a suspension of molybdenum oxide or tungsten oxide or mixtures thereof in an appropriate medium such as amyl acetate-nitrocellulose solution onto the surface of the ceramic body 1. The ceramic body with this suspension of oxides on its surface was then fired in wet hydrogen for about 5 minutes at 1750° C., the oxides being reduced and well-sintered to form a spongy layer on the surface which tightly adheres to the ceramic. While lower sintering temperatures and low humidity hydrogen may also be employed to produce a properly sintered and adherent spongy metal layer, it has been found that higher sintering temperatures and longer firing times produce better results. This applies with particular force in the case of tungsten. Thus, we have found that while a good molybdenum spongy layer may be formed by firing at 1750° C. in hydrogen of a −50° C. dew point for 5 minutes, a tungsten deposit of comparable quality requires firing at 1850° C. in hydrogen at a +20° C. dew point for a considerably longer time. In a similar sense, forming gas ($H_2$-$N_2$ mixtures) may be employed, but higher processing temperature or longer times, or both may be required. Finally, it is possible to form an acceptable spongy layer by starting with the powdered metals instead of their oxides, but we have found that the oxides of the metals, after decomposition, sinter and bond to the ceramic substrate more readily and form better quality layers.

This spongy metal layer was then treated with a concentrated aqueous solution of rhenium heptoxide ($Re_2O_7$), which penetrates into the pores of the sponge and covers the exterior and interior surfaces of the metal layer 2. Any other rhenium-bearing material may be used provided rhenium is the only non-volatile component of the formulation. The spongy metal layer treated with rhenium heptoxide was then fired in hydrogen at about 1000° C. for about 5 minutes, the rhenium heptoxide being reduced to rhenium metal which covers the interior and exterior surfaces of the spongy metal layer without filling the pores thereof and forms an extremely thin adherent layer of rhenium 3, also shown greatly exaggerated in the drawing. In FIG. 1, layer 3 is to be understood to be a very thin surface coverage on layer 2 which renders said layer 2 wettable by the subsequent brazing metal 4 during the attachment of the metal body 5.

A molybdenum body 5 was brazed to the rhenium-coated spongy layer 2 by conventional brazing techniques using the well-known brazing alloy consisting of about 35% cobalt and 65% palladium. The brazing metal penetrated the pores of the spongy layer 2 yielding a completely hermetic seal. Other conventional brazing materials are also suitable.

In the embodiment shown in FIG. 2, the spongy metal layer 2 (also shown greatly exaggerated in the drawing) was applied in the same way to a surface of the ceramic body 1. Instead of treating the spongy layer 2 with rhenium heptoxide, a suspension of about 40 weight percent of ruthenium oxide and the balance of molybdenum oxide in an appropriate medium such as amyl acetate-nitrocellulose solution was deposited on the surface of the spongy layer. The oxide composition cited corresponds approximately to the eutectic mixture of ruthenium and molybdenum metals. Instead of a eutectic mixture of Ru and Mo, any composition in the Ru-Mo system having a melting point below that of the ceramic is satisfactory as a wetting material. The permissible composition range when the ceramic to be sealed is alumina, for instance, is 34 atom percent Ru to 52 atom percent Ru. The following table lists examples of the compositions in this system which are suitable as wetting materials when sealing to alumina:

| Atom Percent Ru | Weight Percent $RuO_2$ in $RuO_2$–$MoO_3$ Mixture | Liquidus Temperature, °C. |
| --- | --- | --- |
| 37.7 | 36.0 | 2,000 |
| 40.4 | 38.6 | 1,965 |
| 41.6 (eutectic composition) | 39.8 | 1,945 [1] |
| 47.9 | 46.1 | 2,000 |

[1] Melting point.

The so-treated spongy layer 2 on the ceramic body 1 was then fired at 1950° C. for about 3 minutes in hydrogen or until the resulting finely-divided mixture was reduced and melted to form a continuous metallic covering 3 on the spongy layer which also completely filled the pores thereof. The ceramic body 1 with the spongy layer 2 and the covering layer 3 of an alloy of ruthenium and molybdenum can now be brazed to a metal body 5 by conventional techniques using a brazing metal 4.

We have brazed the end of an alumina cylinder treated as described above to a refractory metal plate 5 such as tungsten, molybdenum, or rhenium by using a mixture of ruthenium oxide and molybdenum oxide. A washer was first pressed from a mixture of ruthenium oxide and molybdenum oxide in the range above specified and inserted between the metallized ceramic body 1 and the metal body 5. The washer composition may or may not be the same as that used in forming the continuous metallic covering 3 on the spongy layer, but the composition chosen should have a melting point below that of the members to be brazed. The assembly was then heated to about 1950° C. in hydrogen until the oxides decomposed, melted and flowed to form a proper fillet at the joint between the metal body and the metallized ceramic. The so-formed joint was found to be mechanically strong and impermeable to helium and remained so after extensive recycling from ambient temperature to temperatures in excess of 1773° C. (the melting point of platinum). We wish to point out that this constitutes a degree of refractoriness in ceramic-to-metal seals heretofore unknown in the art.

As an alternative to the use of alloys of the Ru-Mo system as wetting and brazing materials, we have found that alloys from the rhodium-molybdenum system are also suitable for these purposes. The composition of the alloy should be so chosen as to have a melting point below that of the refractory ceramic and metal to be joined. For example, when used as a wetting material for preparing metalized alumina for brazing, the composition ranges having the requisite melting points are from 32 weight percent to 55 weight rhodium and from 86 weight percent to 100 weight percent rhodium.

In the event that layers 3 and 4 in FIG. 2 are of identical composition, it is possible to coalesce the deposition of the two separate layers into one operation. While we have employed the oxides of ruthenium and molybdenum, or rhodium and molybdenum in forming layers 3 and 4 in FIG. 2, mixtures or alloys of the metals themselves may also be used.

In the event that an extremely high degree of refractoriness is not necessary, conventional braze materials may be employed. For example, the alloy 35% cobalt, 65% palladium is quite satisfactory and a braze made with this material may be recycled many times to temperatures in excess of 1100° C.

In contrast to the requirements on the ambient atmosphere during the metallizing process (the deposition of layer 2 in FIG. 1 and FIG. 2), subsequent operations including the final braze with Ru-Mo, Rh-Mo, or other braze materials require no close control on the ambient atmosphere. Technical grade hydrogen is suitable for these subsequent operations. In the event that reactive metals such as tantalum or niobium are being brazed, vacuum or inert atmospheres should be employed.

It has been found that resulting ceramic-to-metal seals obtained by the practice of this invention are highly resistant to attack by alkali-metal vapors. For example, a seal of the type shown in FIG. 2 employing a ruthenium-molybdenum alloy metal braze has been shown to be quite unaffected by cesium vapor during many thermal cycles between room temperature and 1250° C. while being exposed to cesium vapor in the pressure range of .06 mm. to 5.4 mm. for an accumulated time of 500 hours. A seal of the type shown in FIG. 1 employing a palladium-cobalt alloy braze has withstood the same cesium vapor exposure at a temperature close to 500° C. Both seals survive undamaged in appearance and function. Such seals are therefore well suited for uses in which hermetic seals resistant to cesium and other alkali-metal vapors at high temperatures are desired, for example in thermionic converters.

It will be understood that the invention is also applicable to ceramic-to-ceramic seals, i.e. joining two refractory ceramic bodies by forming a spongy, refractory metal layer on the surfaces of each of the bodies to be joined which is then treated with the wetting metal and brazed.

While we have described our invention in connection with specific examples and applications thereof, other modifications therein will be apparent to those skilled in this art without departing from the spirit and scope of the invention which is defined in the appended claims.

What we claim is:

1. A method of hermetically joining a refractory ceramic body to a refractory metal surface comprising the steps, forming on a portion of the surface of the ceramic body a tightly-adherent spongy, porous layer of a first refractory metal selected from the group consisting of molybdenum, tungsten and mixtures thereof, applying over the interior and exterior surfaces of the spongy metal layer a second refractory metal selected from the group consisting of rhenium, alloys of ruthenium and molybdenum, and alloys of rhodium and molybdenum which are capable of wetting the first refractory metal, and joining the refractory metal surface to the thus covered surface portion of the ceramic body with a refractory brazing metal.

2. A method of hermetically joining a refractory ceramic body to a refractory metal body comprising the steps, depositing on a portion of the surface of a body of refractory ceramic selected from the group consisting of alumina, magnesia, spinel, and synthetic sapphire a layer of a powdered oxide of a metal selected from the group consisting of molybdenum and tungsten and mixtures thereof, heating said oxide in a reducing atmosphere to a temperature at which the oxide is reduced to metal and a tightly-adherent spongy, porous layer of metal is formed on the surface of the ceramic body, applying over the spongy metal layer a layer of a powdered mixture of molybdenum oxide and an oxide of a metal selected from the group consisting of ruthenium and rhodium in proportions at which an alloy of said metals is formed having a melting point below that of the ceramic and the metal to be joined when said oxides are heated in a reducing atmosphere, heating said oxides in a reducing atmosphere to form said alloy which wets the interior and exterior surfaces of the spongy metal layer and fills the pores thereof, and joining the refractory metal body to the thus covered surface portion of the ceramic body with a refractory brazing metal.

3. A method of hermetically joining a refractory ceramic body to a refractory metal body comprising the steps, depositing on a portion of the surface of a body of a refractory ceramic selected from the group consisting of alumina, magnesia, spinel, and synthetic sapphire a layer of a powdered oxide of a metal selected from the group consisting of molybdenum, tungsten and mixtures thereof, heating said oxide in a reducing atmosphere to a temperature at which the oxide is reduced to metal and a tightly-adherent spongy, porous layer of metal is formed on the surface of the ceramic body, applying over the spongy metal layer a layer of a powdered mixture of molybdenum oxide and an oxide of a metal selected from the group consisting of ruthenium and rhodium in proportions at which an alloy of said metals is formed having a melting point below that of the ceramic and metal to be joined when said oxides are heated in a reducing atmosphere, heating said oxides in a reducing atmosphere to form said alloy which wets the interior and exterior surfaces of the spongy metal layer and fills the pores thereof, and joining the thus covered surface portion of the ceramic body to a body of a refractory metal selected from the group consisting of molybdenum, tungsten and rhenium with a brazing metal consisting of an alloy having a composition similar to that of said wetting alloy and having a melting point below that of the ceramic and the refractory metal.

4. A method as claimed in claim 3 in which the ceramic body covered with the spongy, porous metal layer is wetted and brazed simultaneously to a refractory metal body.

5. A method as claimed in claim 2 in which the ceramic body is alumina and the wetting alloy is composed of about 34 atom percent to about 52 atom percent of ruthenium and the balance molybdenum.

6. A method as claimed in claim 5 in which the wetting alloy is a eutectic mixture of ruthenium and molybdenum metals.

7. A method as claimed in claim 2 in which the oxide of the metal selected from the group consisting of molybdenum, tungsten, and mixtures thereof is heated in a hydrogen atmosphere.

8. A method as claimed in claim 3 in which the wetting and brazing alloy is composed of about 34 atom percent to about 52 atom percent of ruthenium and the balance molybdenum.

9. A method as claimed in claim 3 in which the wetting and brazing alloy is composed of between about 32 to 55 and 86 to 100 weight percent of rhodium and the balance molybdenum.

10. A method of hermetically joining a refractory ceramic body to a refractory metal body comprising the steps, forming on a portion of the surface of a body of a refractory ceramic selected from the group consisting of alumina, magnesia, spinel and synthetic sapphire a spongy, porous layer of a metal selected from the group consisting of molybdenum, tungsten, and mixtures thereof, applying over the spongy, porous metal layer a layer of rhenium heptoxide, heating the rhenium heptoxide in a reducing atmosphere to a temperature at which the oxide is reduced to rhenium which wets the interior and exterior surfaces of the spongy metal layer without filling the pores thereof, and joining the metal body to the thus covered surface portion of the ceramic body with a refractory brazing alloy of palladium and cobalt.

11. A method as claimed in claim 10 in which the metal layer on the ceramic body is formed by depositing an oxide of a metal selected from the group consisting of molybdenum, tungsten and mixtures thereof and said oxide is reduced in an atmosphere of hydrogen.

12. A method as defined in claim 10 in which the brazing alloy is composed of about 65% of palladium and 35% of cobalt.

13. A method of hermetically joining a refractory ceramic body to a refractory metal body comprising the steps, depositing on a portion of the surface of a body of a refractory ceramic selected from the group consisting of alumina, magnesia, spinel, and synthetic sapphire a layer of a powdered oxide of a metal selected from the group consisting of molybdenum, tungsten and mixtures thereof, heating said oxide in a hydrogen atmosphere to a temperature at which the oxide is reduced to metal and a tightly-adherent spongy, porous layer of metal is formed on the surface of the ceramic body, applying over the spongy metal layer a layer of an alloy of molybdenum and ruthenium having a melting point below that of the ceramic and metal to be joined, heating said alloy to melt the same and wet the interior and exterior surfaces of the spongy metal layer and fill the pores thereof, and joining the thus covered surface portion of the ceramic body to a body of a refractory metal selected from the group consisting of molybdenum, tungsten and rhenium with a brazing metal consisting of an alloy having a composition similar to that of said wetting alloy and having a melting point below that of the ceramic and the refractory metal.

14. A method of hermetically joining a refractory ceramic body to a refractory metal body comprising the steps, depositing on a portion of the surface of a body of a refractory ceramic selected from the group consisting of alumina, magnesia, spinel, and synthetic sapphire a layer of a powdered oxide of a metal selected from the group consisting of molybdenum, tungsten and mixtures thereof, heating said oxide in a hydrogen atmosphere to a temperature at which the oxide is reduced to metal and a tightly-adherent spongy, porous layer of metal is formed on the surface of the ceramic body, applying over the spongy metal layer a layer of an alloy of molybdenum and rhodium having a melting point below that of the ceramic and metal to be joined, heating said alloy to melt the same and wet the interior and exterior surfaces of the spongy metal layer and fill the pores thereof, and joining the thus covered surface portion of the ceramic body to a body of a refractory metal selected from the group consisting of molybdenum, tungsten and rhenium with a brazing metal consisting of an alloy having a composition similar to that of said wetting alloy and having a melting point below that of the ceramic and the refractory metal.

References Cited

UNITED STATES PATENTS

| | | | |
|---|---|---|---|
| 2,504,522 | 4/1950 | Greiner | 174—50.63 |
| 2,776,472 | 1/1957 | Mesick | 29—492 X |
| 2,830,169 | 4/1958 | Medicus | 219—92 |
| 2,914,640 | 11/1959 | Grattidge | 29—198 X |
| 3,024,522 | 3/1962 | Cacciotti | 29—195 |
| 3,107,756 | 10/1963 | Gallet | 29—473.1 X |
| 3,110,101 | 11/1963 | Kieffer | 29—198 X |
| 3,132,928 | 5/1964 | Crooks | 29—198 |
| 3,276,113 | 10/1966 | Metcalfe | 29—487 |
| 3,339,267 | 9/1967 | Bronnes | 29—473.1 |

OTHER REFERENCES

High Temperature Brazing, 75/172, Batelle Technical Review, vol. 5, No. 8, August 1956, pp. 8–12, by Robert M. Evans.

JOHN F. CAMPBELL, *Primary Examiner*.

R. F. DROPKIN, *Assistant Examiner*.